(12) United States Patent
Li et al.

(10) Patent No.: US 9,979,522 B2
(45) Date of Patent: May 22, 2018

(54) MULTIPLEXING DRS WITHIN A TRANSMISSION BURST FOR OPPORTUNISTIC SPECTRUM ACCESS

(71) Applicant: MEDIATEK INC., Hsinchu (TW)

(72) Inventors: Chien-Chang Li, Penghu County (TW); Weidong Yang, San Diego, CA (US); Pei-Kai Liao, Nantou County (TW); Bo-Si Chen, Keelung (TW)

(73) Assignee: MEDIATEK INC., HsinChu (TW)

( * ) Notice: Subject to any disclaimer, the term of this patent is extended or adjusted under 35 U.S.C. 154(b) by 56 days.

(21) Appl. No.: 15/281,030

(22) Filed: Sep. 29, 2016

(65) Prior Publication Data

US 2017/0093542 A1   Mar. 30, 2017

Related U.S. Application Data

(60) Provisional application No. 62/234,913, filed on Sep. 30, 2015.

(51) Int. Cl.
*H04W 48/16* (2009.01)
*H04W 72/04* (2009.01)
(Continued)

(52) U.S. Cl.
CPC .......... *H04L 5/0048* (2013.01); *H04W 48/16* (2013.01); *H04W 72/042* (2013.01); *H04W 72/0446* (2013.01); *H04W 88/02* (2013.01)

(58) Field of Classification Search
CPC .............. H04W 48/16; H04W 72/042; H04W 72/0446; H04W 24/10; H04W 24/08;
(Continued)

(56) References Cited

U.S. PATENT DOCUMENTS 9,559,797 B2 *   1/2017   Liao ..................... H04J 11/005
2015/0208333 A1   7/2015   Yie et al. ..................... 455/561
(Continued)

FOREIGN PATENT DOCUMENTS

WO   WO2015133823 A1   9/2015

OTHER PUBLICATIONS

International Search Report and Written Opinion of International Search Authority for PCT/CN2016/101217 dated Dec. 23, 2016 (11 pages).

(Continued)

*Primary Examiner* — Ahmed Elallam
(74) *Attorney, Agent, or Firm* — Imperium Patent Works; Zheng Jin; Helen Mao

(57) ABSTRACT

Methods and apparatus are provided for multiplexing DRS within a transmission burst for opportunistic spectrum access. In one novel aspect, DRS is not transmitted in a fractional subframe within a TXOP. In one embodiment, if the starting fractional subframe, which contains initial signal, occurs in a configured DMTC, DRS is transmitted in the first subframe next to the starting fractional subframe. In another embodiment, if DMTC starts from a complete subframe within a TXOP, DRS is transmitted in the first candidate position within a DMTC. In another novel aspect, in the DRS subframe, PDSCH is allocated in the PRBs outside the central PRBs (six or twenty-five PRBs). In one embodiment, the reservation signal can be used to satisfy the requirement of occupied bandwidth and continuity transmission. In another embodiment, the free REs in central PRBs carry the system information when required on the unlicensed band.

24 Claims, 6 Drawing Sheets

(51) Int. Cl.
*H04W 28/26* (2009.01)
*H04L 5/00* (2006.01)
*H04W 88/02* (2009.01)

(58) Field of Classification Search
CPC .............. H04W 76/048; H04W 88/02; H04L 27/2613; H04L 5/0073; H04J 11/0079
See application file for complete search history.

(56) References Cited

U.S. PATENT DOCUMENTS

| | | | |
|---|---|---|---|
| 2015/0223245 A1 | 8/2015 | Cheng et al. | 370/329 |
| 2015/0264592 A1* | 9/2015 | Novlan | H04L 27/2601 370/252 |
| 2016/0073366 A1* | 3/2016 | Ng | H04W 56/001 370/329 |
| 2016/0227427 A1* | 8/2016 | Vajapeyam | H04W 76/048 |
| 2016/0262000 A1* | 9/2016 | Koorapaty | H04W 48/12 |
| 2017/0048808 A1* | 2/2017 | Huang | H04W 52/52 |
| 2017/0055202 A1* | 2/2017 | Uchiyama | H04W 24/10 |
| 2017/0201898 A1* | 7/2017 | Park | H04W 24/08 |
| 2017/0215133 A1* | 7/2017 | Yang | H04W 48/16 |
| 2017/0257785 A1* | 9/2017 | Henttonen | H04W 24/10 |
| 2017/0359133 A1* | 12/2017 | Kim | H04B 17/318 |

OTHER PUBLICATIONS

3GPP TSG RAN Wg1 Meeting #82 R1-156057, MediaTek Inc., Enhanced DRS Design for LAA, Malmö, Sweden, dated Oct. 5-9, 2015 (7 pages).

\* cited by examiner

MULTIPLEXING DRS WITHIN A TRANSMISSION BURST FOR OPPORTUNISTIC SPECTRUM ACCESS

CROSS REFERENCE TO RELATED APPLICATIONS

This application claims priority under 35 U.S.C. § 119 from U.S. Provisional Application No. 62/234,913 entitled "Multiplexing DRS within a Transmission Burst for Opportunistic Spectrum Access" filed on Sept. 30, 2015, the subject matter of which is incorporated herein by reference.

TECHNICAL FIELD

The disclosed embodiments relate generally to wireless communication, and, more particularly, to methods and apparatus multiplexing DRS within a transmission burst for opportunistic spectrum access.

BACKGROUND

In 3GPP RAN Session #65, Licensed-assisted access (LAA) has been approved to enable LTE usage over unlicensed spectrum for small cells. To have an efficient and fair spectrum sharing, a dynamic spectrum sharing mechanism called listen-before-talk (LBT) needs to be supported in European and Japan. In 3GPP meeting, the modified load based equipment (LBE) is used for the transmission burst. Due to the LBE mechanism, there may be fractional subframes in the beginning or end. To support the transmission of fractional subframe, an initial signal is designed for channel reservation, detection of the transmission burst, and coarse time/frequency synchronization. A discovery reference signal (DRS) is required for the unlicensed band operation. For UE measurement, a DRS measurement timing configuration (DMTC) is configured with a periodicity. Under the LBE, when a data transmission collides with the DMTC, wherein the DRS is to be transmitted, how to multiplex DRS in the transmit opportunity (TxOP) remains an issue. Further, how to allocate the PDSCH in the subframe that contains the DRS remains a question as well.

Improvements and enhancements are required for multiplexing DRS within a transmission burst for opportunistic spectrum access.

SUMMARY

Methods and apparatus are provided for multiplexing DRS within a transmission burst for opportunistic spectrum access. In one novel aspect, DRS is not transmitted in a fractional subframe within a TXOP. In one embodiment, the network entity configures discovery reference signal (DRS) measurement timing configuration (DMTC) information by a network entity in a wireless network, wherein the DMTC is configured with a periodicity, and wherein each DMTC includes one or more DRS positions. The network entity attempting to send a DRS on an unlicensed band during a current DMTC period, wherein at least part of the current DMTC period collides with a data transmission within a transmission opportunity (TxOP), and wherein the data transmission has one or more fractional frames. The network entity sends the DRS during the current DMTC period, wherein the DRS in the current DMTC period is transmitted in a complete subframe of the TXOP. In one embodiment, if the starting fractional subframe, which contains initial signal, occurs in a configured DMTC, DRS is transmitted in the first subframe next to the starting fractional subframe. In another embodiment, if DMTC starts from a complete subframe within a TXOP, DRS is transmitted in the first candidate position within a DMTC.

In another novel aspect, in the DRS subframe, PDSCH is allocated in the PRBs outside the central PRBs. In one embodiment, the central PRBs has six PRBs. In another embodiment, the central PRBs has twenty-five PRBs. In one embodiment, the reservation signal can be used to satisfy the requirement of occupied bandwidth and continuity transmission. In another embodiment, if system information is required on the unlicensed band, the free REs in central 6 PRB (or 25 PRBs) can be used to carry the system information.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
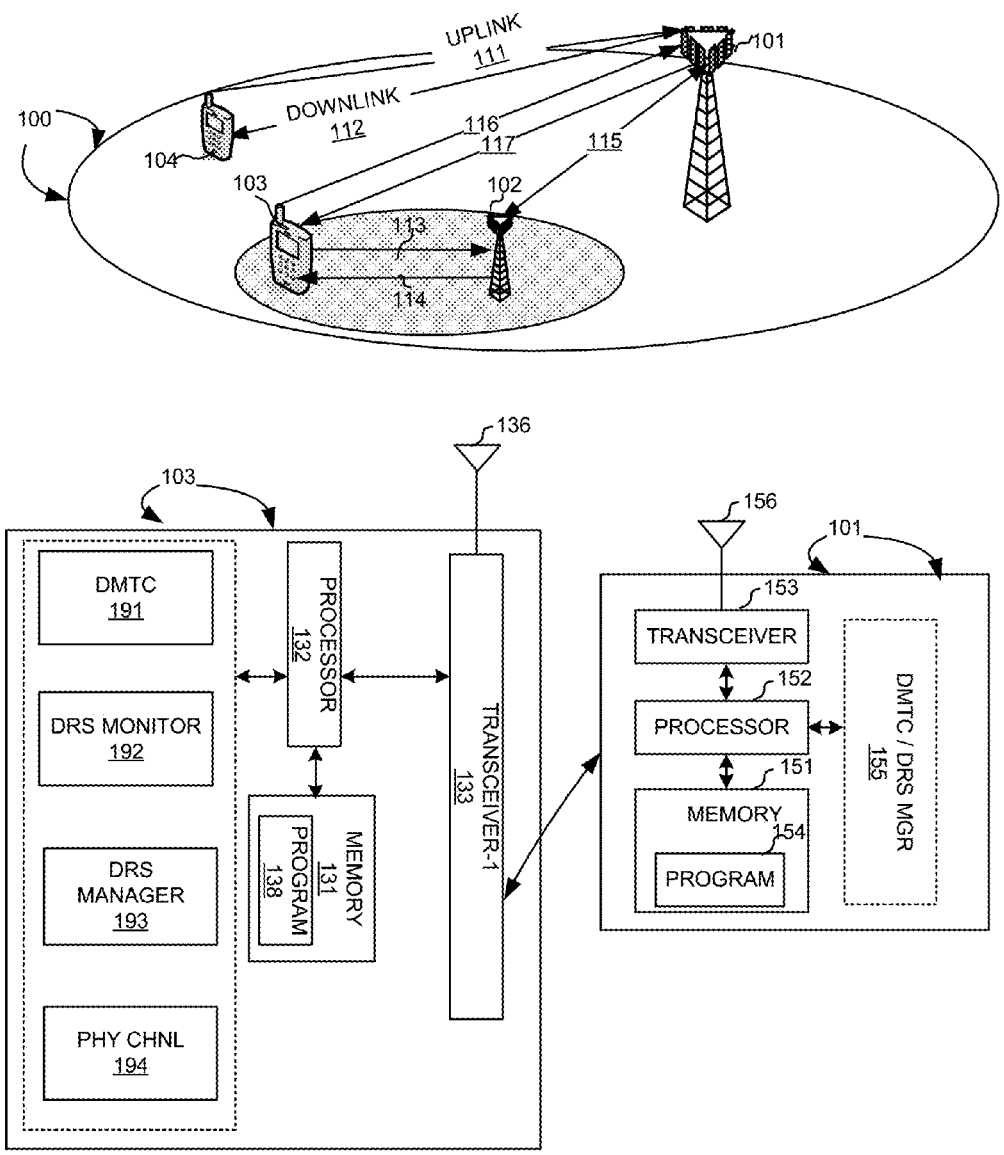
FIG. 1 illustrates a system diagram of a wireless network operating in the licensed and unlicensed band in accordance with embodiment of the current invention.

FIG. 1 illustrates a system diagram of a wireless network operating in the licensed and unlicensed band in accordance with embodiment of the current invention. Wireless communication system 100 includes one or more fixed base infrastructure units, such as base stations 101 and 102, forming a network distributed over a geographical region. The base unit may also be referred to as an access point, an access terminal, a base station, a Node-B, an eNode-B, or by other terminology used in the art. The one or more base stations 101 and 102 serve a number of mobile stations 103 and 104 within a serving area, for example, a cell, or within a cell sector. Base stations 101 and 102 can support different RATS. The two base stations simultaneously serve the mobile station 103 within their common coverage.

Base stations 101 and 102 transmit downlink communication signals 112, 114 and 117 to mobile stations in the time and/or frequency domain. Mobile station 103 and 104 communicate with one or more base stations 101 and 102 via uplink communication signals 111, 113 and 116.

In one novel aspect, base station 102 can operates on the unlicensed band. The LTE-Advanced networks enable the users to take advantage of unlicensed spectrum. The Licensed Assisted Access (LAA) feature will enable LTE-Advanced to use unlicensed frequencies as an adjunct to licensed bands, to boost capacity for network operators and performance for service users. LAA will build on existing carrier aggregation capabilities of LTE-Advanced, with new features introduced to achieve fair co-existence with WiFi and other users of unlicensed spectrum. Base station 102 operates in small cell environment using unlicensed band.

FIG. 1 further shows simplified block diagrams of base station 101 and mobile station 103 in accordance with the current invention. Base station 101 has an antenna 156, which transmits and receives radio signals. A RF transceiver module 153, coupled with the antenna, receives RF signals from antenna 156, converts them to baseband signals and sends them to processor 152. RF transceiver 153 also converts received baseband signals from processor 152, converts them to RF signals, and sends out to antenna 156. Processor 152 processes the received baseband signals and invokes different functional modules to perform features in eNB 101. Memory 151 stores program instructions and data 154 to control the operations of eNB 101. Base station 101 also includes a set of control modules such as the DMTC/DRS manager circuit 155 that handles the building and sending the DRS information to the mobile stations.

Mobile station 103 has an antenna 136, which transmits and receives radio signals. A RF transceiver module 133, coupled with the antenna, receives RF signals from antenna 136, converts them to baseband signals and sends them to processor 132. RF transceiver 136 also converts received baseband signals from processor 132, converts them to RF signals, and sends out to antenna 136. Processor 132 processes the received baseband signals and invokes different functional modules to perform features in mobile station 103. Memory 131 stores program instructions and data 138 to control the operations of mobile station 103.

Mobile station 103 also includes a set of control modules that carry out functional tasks. A discovery reference signal (DRS) measurement timing configuration (DMTC) circuit 191 obtains DMTC information, wherein the DMTC is configured with a periodicity, and wherein each DMTC includes one or more DRS positions. A DRS monitor 192 listens for a DRS on an unlicensed band during a current DMTC period, wherein at least part of the current DMTC period collides with a data transmission within a transmission opportunity (TxOP), and wherein the data transmission has an initial signal and one or more fractional frames. A DRS manager 193 obtains the DRS during the current DMTC period, wherein at least one DRS position in the current DMTC period is in a complete subframe.

To support the transmission of fractional subframe, an initial signal is designed for channel reservation, detection of the transmission burst, and coarse time/frequency synchronization. Since the transmission on the unlicensed band is opportunistic, the discovery reference signal (DRS) is required for cell detection, time/frequency tracking, and radio resource management (RRM). The discovery reference signal can also carry the information of operator identification, LBT scheme, detailed DL/UL LBT configurations, and channel access priority of the network. In 3GPP meeting, the modified frame based equipment (FBE) is used for the discovery reference signal. For UE measurement, a DRS measurement timing configuration (DMTC) is configured with a periodicity.

Figure 2:
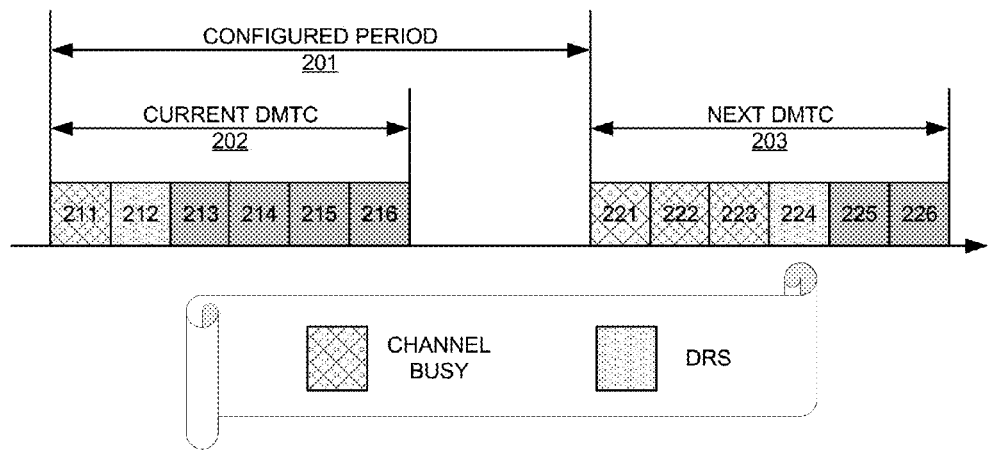
FIG. 2 shows an exemplary diagram of LBT mechanism for DRS in accordance with embodiments of the current invention.

FIG. 2 shows an exemplary diagram of LBT mechanism for DRS in accordance with embodiments of the current invention. In this example, there are six candidate positions in a DMTC. If channel is busy in the current candidate position, eNB will try to perform LBT in the next candidate position. A configured period 201 is configured such that a DMTC is within configured period 201. In one embodiment, a current DMTC 202 includes six DRS positions, 211, 212, 213, 214, 215, and 216. In this example, DRS position 211 s detected to be busy. Therefore, the DRS is transmitted at position 212. Once the configured period 201 expired, a next DMTC 203 is configured including six DRS positions, 221, 222, 223 224, 225, and 226. During the next DMTC period 203, positions 221, 222 and 223 are all busy. The DRS is transmitted at position 224.

Figure 3:
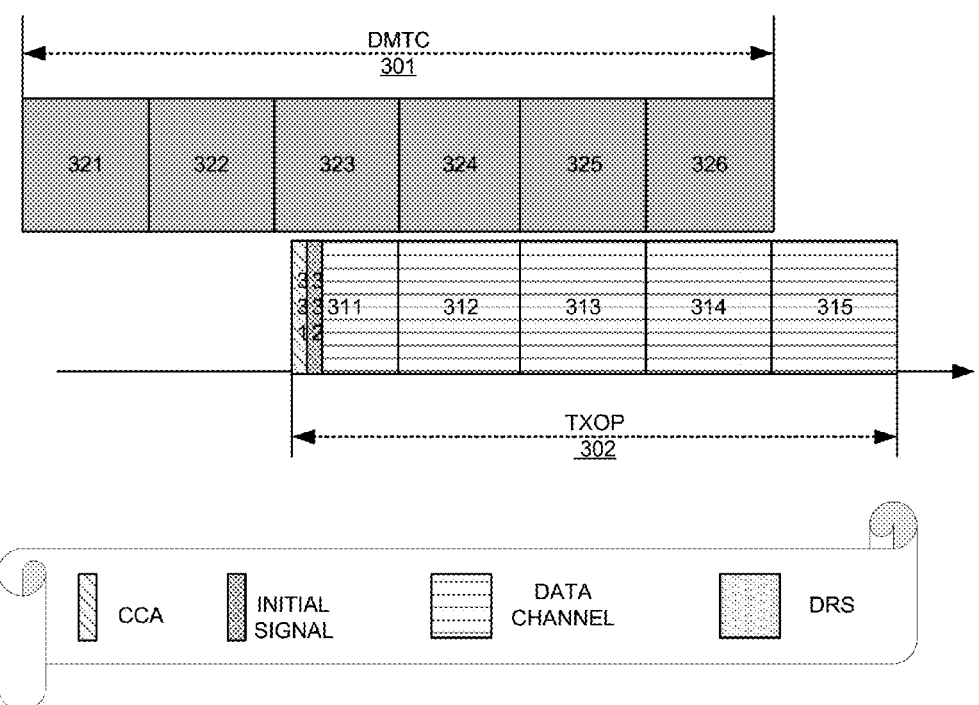
FIG. 3 illustrates an exemplary diagram of the TxOP collides with the DMTC and the data transmission in the TxOP includes initial signal and partial frames.

FIG. 3 illustrates an exemplary diagram of the TxOP collides with the DMTC and the data transmission in the TxOP includes initial signal and partial frames. A DMTC 301 is configured with six DRS positions: 321, 322, 323, 324, 325, and 326. As an example, part of the DTMC positions collides with the data transmission during TxOP 302. Data can be transmitted in periods 311, 312, 313, 314, and 315. Initial signal 332 and CCA signaling 331 are transmitted during period 311. In one embodiment, when the DMTC collides with the TxOP, the DRS are only transmitted in the subframe without initial signal. In addition, the DRS are transited in the DRS position with a complete subframe.

There are different scenarios that a data transmission may collide with the DMTC. The first scenario is that the starting fractional subframe, which contains initial signal, occurs in a configured DMTC. There are two possibilities, one the DRS was transmitted before the start of the TxOP, and two the DRS was not transmitted and a TxOP comes. In another scenario, the TxOP starts earlier and the DMTC starts from a complete subframe within a TxOP. In a third scenario the DMTC starts from the fractional ending subframe. In all the cases, the DRS should be transmitted on a whole subframe without the initial signal. The following figures illustrate different scenarios and the corresponding solutions.

Figure 4:
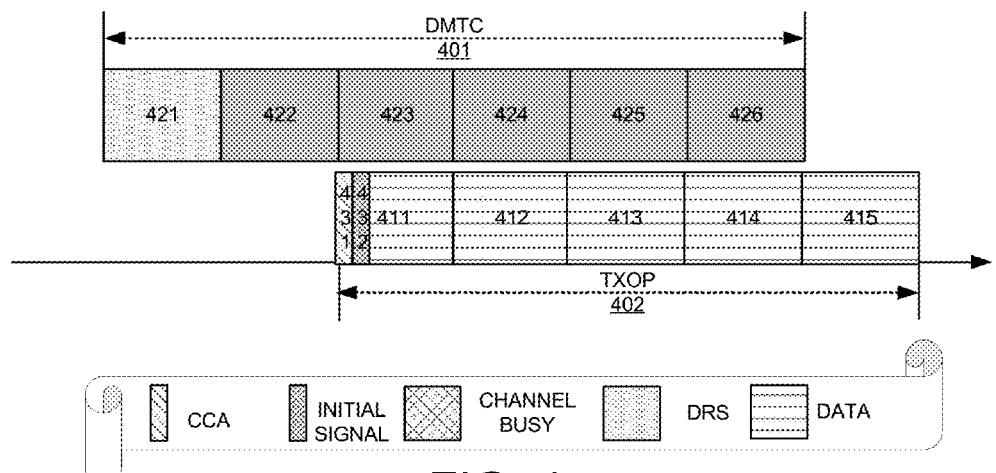
FIG. 4 illustrates an exemplary diagram of the DRS has been transmitted before a TxOP in accordance with embodiments of the current invention.

FIG. 4 illustrates an exemplary diagram of the DRS has been transmitted before a TxOP in accordance with embodiments of the current invention. In one scenario, the configured DMTC collides with the TxOP. However, the DRS has been transmitted before the start of the TxOP. Therefore, there is no multiplexing issue. A DMTC 401 includes six positions, 421, 422, 423, 424, 425, and 426. A TxOP 402 has a starting frame 411, which also includes a CCA frame 431 and an initial signal frame 432. Multiple data frames are transmitted in TxOP 402, including 412, 413, 414, and 415. DMTC 401 collides with TxOP 402. DMTC 401 collides with TxOP 402 from position 423. However, the DRS is transmitted at position 421, which is earlier than the start of TxOP 402. Therefore, the DRS is transmitted without any collision. In this scenario, there is no issue regarding the multiplexing.

Figure 5:
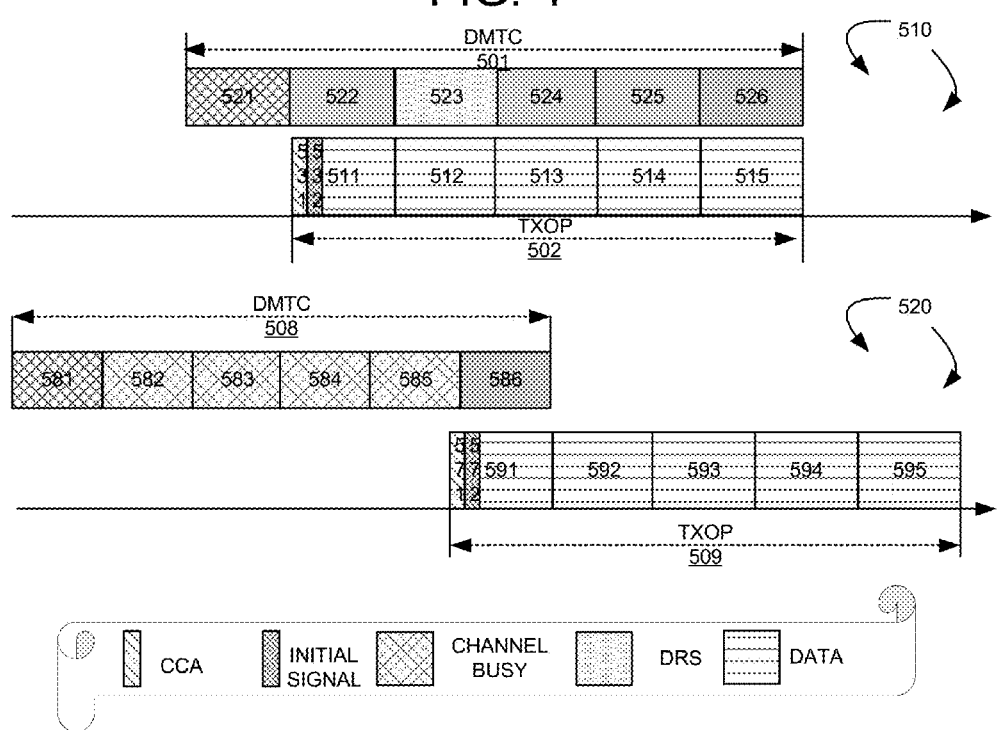
FIG. 5 shows exemplary diagrams for two scenarios when the DRS is not transmitted and a TxOP comes in accordance with embodiments of the current invention.

FIG. 5 shows exemplary diagrams for two scenarios when the DRS is not transmitted and a TxOP comes in accordance with embodiments of the current invention. In a separate scenario, the configured DMTC collides with the TxOP and the DRS is not transmitted when the collision occurs. In one case, the DRS can be multiplexed onto another DRS position within the current DMTC where a full subframe is available. As shown in 510, a configured DMTC 501 has six opportunities including 521, 522, 523, 524, 525, and 526. A TxOP 502 collides with DMTC 501. TxOP 502 includes data frames 511, 512, 513, 514, and 515. TxOP 502 also includes a CCA frame 531 and an initial signal frame 532. DMTC 501 collides with TxOP 502 starting from position 522. Position 521, though occurs before the start of TxOP 511, it was detected as being busy and cannot be used for DRS transmission. The next available DRS position is 522. 522 collides with the first frame 511 of TxOP 502. Frame 511 also has a CCA frame and an initial signal frame. If DRS is to be transmitted on position 522 a new rate matching pattern is required. In one embodiment, the DRS can only be transmitted in the subframe without initial signal. Therefore, the possible candidates for the DRS are positions 523, 524, 525, and 526. In another embodiment, the DRS is transmitted in the first subframe next to the starting fractional subframe if the MDTC overlaps with TxOP with at least a whole subframe. In another embodiment, the DRS may occupy other positions that are avaible. In this case, DRS position 523 is chosen to transmit the DRS.

Diagram 520 shows another scenario. DMTC 508 has six DRS positions 581, 582, 583, 584, 585, and 586. A TxOP 509 has multiple data frames includes 591, 592, 593, 594, and 595. TxOP 509 also includes a CCA frame 571 and an initial signal frame 572. DMTC 508 collides with TxOP 509. In addition, DRS positions 581 to 585 are all busy and cannot be used for the DRS. The last position of the current DMTC 508 is available. However, position 586 collides with the initial signal frame 572 in TxOP 509. In one embodiment, the DRS can only be transmitted in the subframe without initial signal. Therefore, the DRS cannot be transmitted in the current DMTC 508. The DRS will be transmitted in the next DMTC configured.

Figure 6:
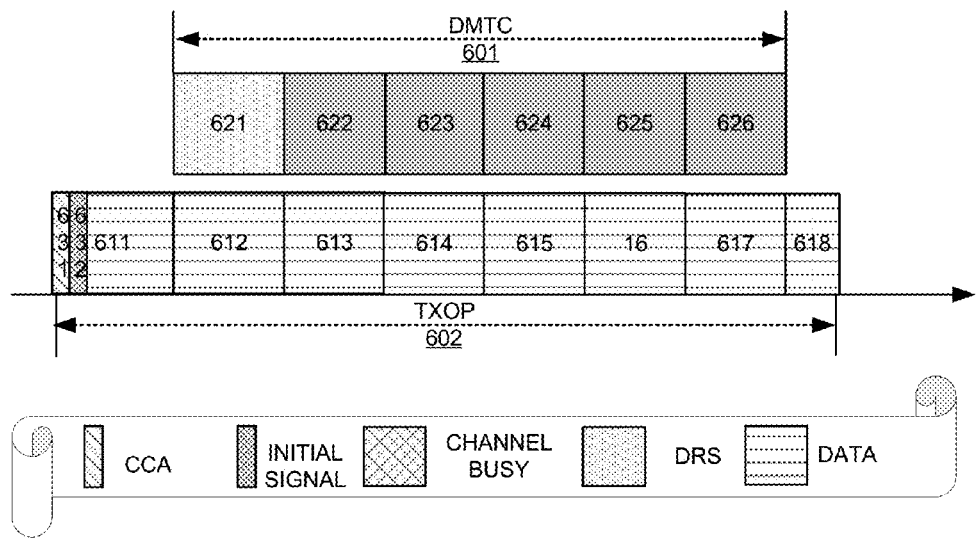
FIG. 6 illustrates an exemplary diagram of the DMTC starts from a complete subframe within a TxOP in accordance with embodiments of the current invention.

FIG. 6 illustrates an exemplary diagram of the DMTC starts from a complete subframe within a TxOP in accordance with embodiments of the current invention. In some scenarios, the DMTC starts from a complete subframe within a TxOP. DRS can be transmitted in any complete subframe in a TXOP. To reduce UE complexity it is preferred that DRS is transmitted in the first candidate position within a DMTC. A configured DMTC 601 has six DRS positions including 621, 622, 623, 624, 625, and 626. A TxOP 602 includes several data frames including 611, 612, 613, 614, 615, 617, and 618. A CCA frame 631 and an initial signal frame 632 occupies part of 611. The ending frame 618 is a partial frame. The DRS positions of DMTC 601 collides with complete frames of TxOP 602, including 612, 613, 614, 615, 616, and 617. In one embodiment, the DRS can be transmitted in any available position. In one embodiment, the DRS is transmitted on a predefined position. In another embodiment, the DRS is transmitted in the first candidate position within DMTC 601. As shown, the DRS is transmitted at position 621.

Figure 7:
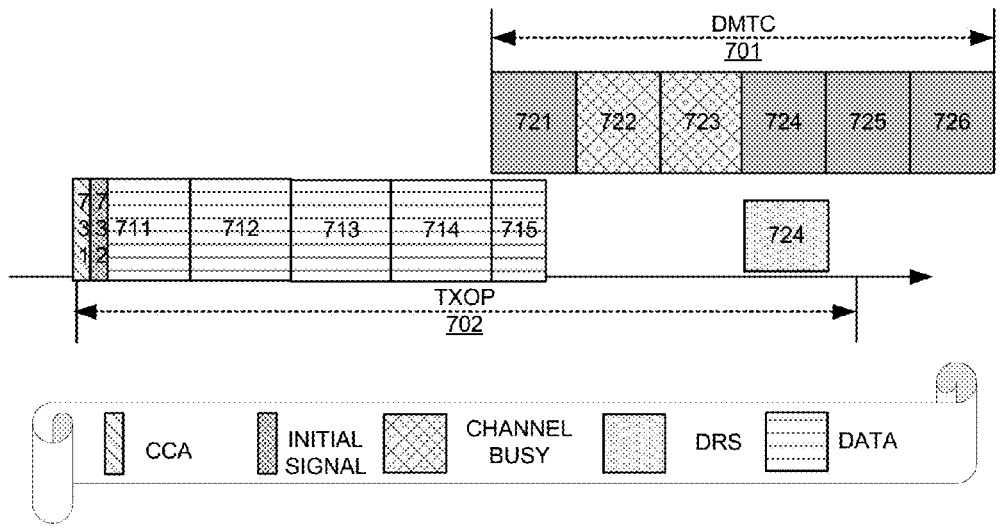
FIG. 7 illustrates an exemplary diagram of the DMTC starts from the fractional ending subframe in accordance with embodiment of the current invention.

FIG. 7 illustrates an exemplary diagram of the DMTC starts from the fractional ending subframe in accordance with embodiment of the current invention. In one scenario, the DMTC starts from the fractional ending subframe of a TxOP. In this case, a new rate matching pattern is required if DRS appears in the ending subframe. To minimize the UE impact, we suggest transmitting DRS in the other candidate positions in a configured DMTC. A DMTC 701 is configured with six DRS positions including 721, 722, 723, 724, 725, and 726. A TxOP 702 has multiple data frames include 711, 712, 713, 714, and 715. A CCA frame 731 and an initial signal frame 732 are also included. The ending frame 715 is a partial frame. DMTC 701 collides with TxOP 702 with the overlap at the ending partial frame 715. In one embodiment, even though DRS position 721 is not busy, it is not used for the DRS transmission because it collides with the partial frame 715 of TxOP 702. DRS positions 722 and 723 are both busy. Therefore, only DRS positions 724, 725, and 726 are DRS candidate positions. In one embodiment, the first available candidate is chosen for the DRS transmission, which is DRS position 724.

As shown above, in one novel aspect, DRS is not transmitted in a fractional subframe of a TxOP. If the starting fractional subframe, which contains which contains initial signal, occurs in a configured DMTC, DRS is transmitted in the first subframe next to the starting fractional subframe. If DMTC starts from a complete subframe within a TXOP, DRS is transmitted in the first candidate position within a DMTC.

When DRS is multiplexed within a TXOP, one question is about the resource allocation of PDSCH. From the point of spectral efficiency, data bits are required to be put in all the free REs within a DRS subframe, where DRS subframe is defined as the subframe contains DRS. From system view, if LAA wants to support transmitting system information (information of system bandwidth, operator identification, frame number, etc.) on unlicensed band, DRS subframe can serve this purpose. In the predefined central frequency band, DRS with the system information or reservation signal is transmitted. The data bits are only transmitted in the frequency band outside the predefined central frequency band such as the LAA system.

In one novel aspect, the DRS is transmitted in the central PRBs. the free resource elements (REs) in the central 6 physical resource blocks (PRBs) within a DRS subframe, which is independent of the total channel bandwidth, is used to carry the system information and hence PDSCH is not transmitted in these RBs. Although 3GPP R13 LAA may not transmit system information on the unlicensed band, we can still reserve the free REs in the central six PRBs. In the future release, if system information is required to be transmitted on the unlicensed carrier, we can use the reserved REs for this purpose.

Figure 8:
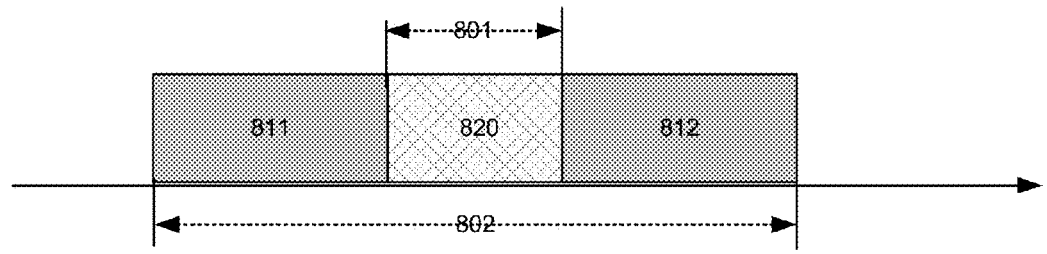
FIG. 8 shows an exemplary diagram of using the central PRBs for system information as reserved REs in accordance with embodiments of the current invention.

FIG. 8 shows an exemplary diagram of using the central PRBs for system information as reserved REs in accordance with embodiments of the current invention. A set of central PRBs 801 resides at the center of the DRS frame 802. The PRBs of 811 and 812 carry information of DRS and PDSCH. Central PRBs 813 carries DRS and reservation signal and/or system information when configured. In one embodiment, 813 has six PRBs. In another embodiment, 813 has twenty-five PRBs. In the DRS subframe, PDSCH is allocated in the PRBs outside the central 6 PRBs (or 25 PRBs). The reservation signal can be used to satisfy the requirement of occupied bandwidth and continuity transmission. If system information is required on the unlicensed band, the free REs in central 6 PRB (or 25 PRBs) can be used to carry the system information.

Figure 9:
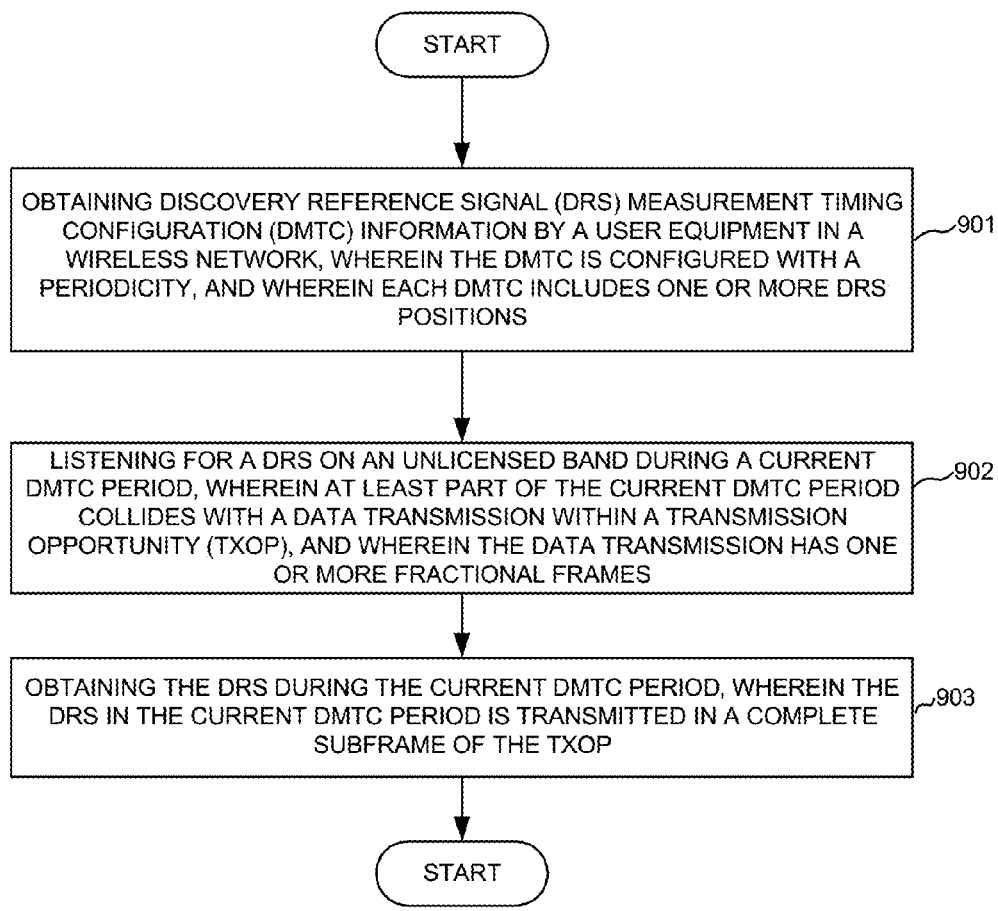
FIG. 9 illustrates an exemplary flow chart for the UE to obtain the DRS in a DMTC in accordance with embodiments of the current invention.

FIG. 9 illustrates an exemplary flow chart for the UE to obtain the DRS in a DMTC in accordance with embodiments of the current invention. At step 901, the UE obtains discovery reference signal (DRS) measurement timing configuration (DMTC) information in a wireless network, wherein the DMTC is configured with a periodicity, and wherein each DMTC includes one or more DRS positions. At step 902, the UE listening for a DRS on an unlicensed band during a current DMTC period, wherein at least part of the current DMTC period collides with a data transmission within a transmission opportunity (TxOP), and wherein the data transmission has one or more fractional frames. At step 902, the UE obtaining the DRS during the current DMTC period, wherein the DRS in the current DMTC period is transmitted in a complete subframe of the TXOP.

Figure 10:
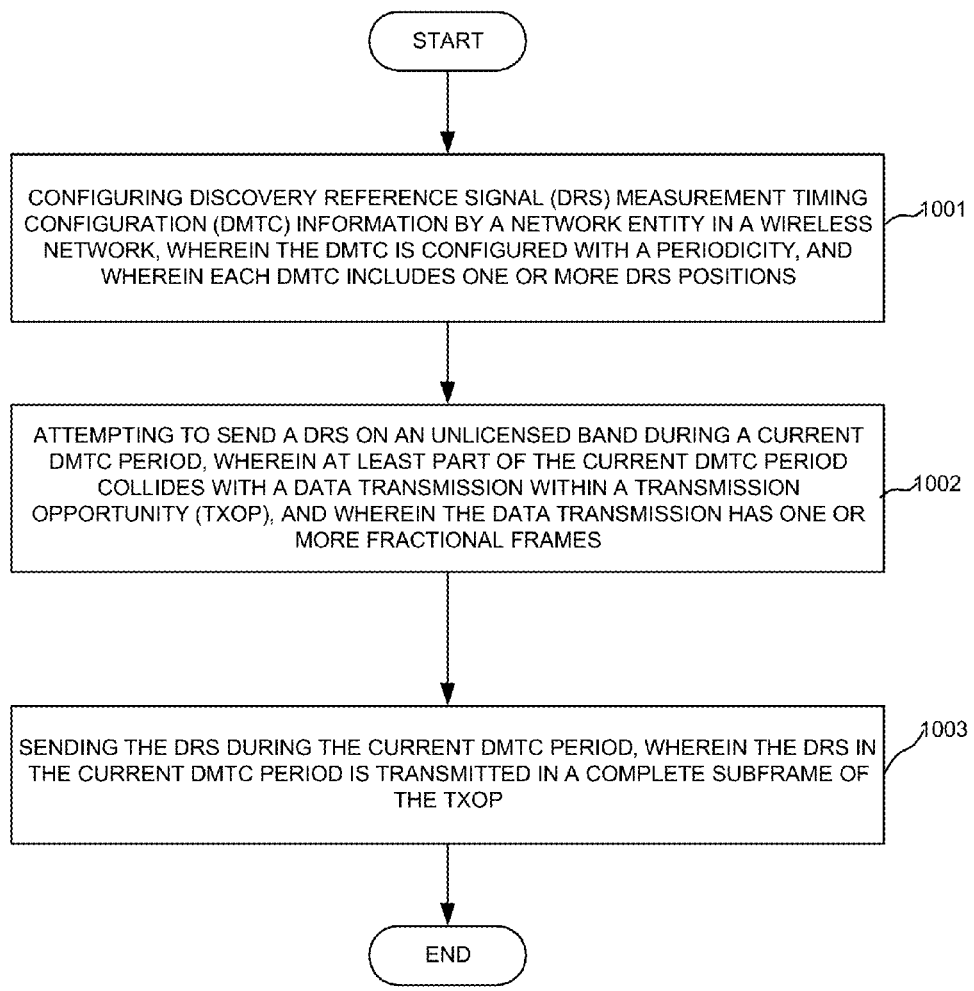
FIG. 10 illustrates an exemplary flow chart for the network entity to encode and send the DRS in a DMTC in accordance with embodiments of the current invention.

FIG. 10 illustrates an exemplary flow chart for the network entity to encode and send the DRS in a DMTC in accordance with embodiments of the current invention. At step 1001, the network entity configuring discovery reference signal (DRS) measurement timing configuration (DMTC) information in a wireless network, wherein the DMTC is configured with a periodicity, and wherein each DMTC includes one or more DRS positions. At step 1002, the network entity attempts to send a DRS on an unlicensed band during a current DMTC period, wherein at least part of the current DMTC period collides with a data transmission within a transmission opportunity (TxOP), and wherein the data transmission has one or more fractional frames. At step 1003, the network entity sends the DRS during the current DMTC period, wherein the DRS in the current DMTC period is transmitted in a complete subframe of the TXOP.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   obtaining discovery reference signal (DRS) measurement timing configuration (DMTC) information by a user equipment in a wireless network, wherein the DMTC is configured with a periodicity, and wherein each DMTC includes one or more DRS positions;
   listening for a DRS on an unlicensed band during a current DMTC period, wherein at least part of the current DMTC period collides with a data transmission within a transmission opportunity (TxOP), and wherein the data transmission has one or more fractional frames; and
   obtaining the DRS during the current DMTC period, wherein the DRS in the current DMTC period is transmitted in a complete subframe of the TXOP.

2. The method of claim 1, wherein the current DMTC starts before the TxOP and the DRS is transmitted in a position before the TxOP.

3. The method of claim 1, wherein the current DMTC starts before the TxOP and the DRS is not transmitted before the TxOP, and wherein the DRS is transmitted in a predefined subframe next to a starting fractional subframe of the data transmission, and wherein the current DMTC overlaps with the TxOP with at least a whole subframe.

4. The method of claim 1, wherein the current DMTC starts from a complete subframe within the TxOP, and wherein the DRS is transmitted in a predefined candidate position of the current DMTC.

5. The method of claim 1, wherein the current DMTC starts from a fractional ending subframe, and wherein the DRS is transmitted in another candidate position of the current DMTC.

6. The method of claim 1, wherein the DRS is multiplexed within the TxOP, and wherein a number of central PRBs are reserved such that the PDSCH is transmitted outside the reserved PRBs.

7. The method of claim 6, wherein system information is required on the unlicensed band, and wherein the reserved central PRBs carry the required system information.

8. The method of claim 6, wherein the reserved central PRBs are used to satisfy the requirement of occupied bandwidth and continuity transmission.

9. A method comprising:
   configuring discovery reference signal (DRS) measurement timing configuration (DMTC) information by a network entity in a wireless network, wherein the DMTC is configured with a periodicity, and wherein each DMTC includes one or more DRS positions;
   attempting to send a DRS on an unlicensed band during a current DMTC period, wherein at least part of the current DMTC period collides with a data transmission within a transmission opportunity (TxOP), and wherein the data transmission has one or more fractional frames; and
   sending the DRS during the current DMTC period, wherein the DRS in the current DMTC period is transmitted in a complete subframe of the TXOP.

10. The method of claim 9, wherein the current DMTC starts before the TxOP and the DRS is transmitted in a position before the TxOP.

11. The method of claim 9, wherein the current DMTC starts before the TxOP and the DRS is not transmitted before the TxOP, and wherein the DRS is transmitted in a predefined subframe next to a starting fractional subframe of the data transmission, and wherein the current DMTC overlaps with the TxOP with at least a whole subframe.

12. The method of claim 9, wherein the current DMTC starts from a complete subframe within the TxOP, and wherein the DRS is transmitted in a predefined candidate position of the current DMTC.

13. The method of claim 9, wherein the current DMTC starts from a fractional ending subframe, and wherein the DRS is transmitted in another candidate position of the current DMTC.

14. The method of claim 9, wherein the DRS is multiplexed within the TxOP, and wherein a number of central PRBs are reserved such that the PDSCH is transmitted outside the reserved PRBs.

15. The method of claim 14, wherein system information is required on the unlicensed band, and wherein the reserved central PRBs carry the required system information.

16. The method of claim 14, wherein the reserved central PRBs are used to satisfy the requirement of occupied bandwidth and continuity transmission.

17. An user equipment (UE), comprising:
   a radio frequency (RF) transceiver that transmits and receives radio signals in the wireless communication network;
   a discovery reference signal (DRS) measurement timing configuration (DMTC) circuit that obtains DMTC information, wherein the DMTC is configured with a periodicity, and wherein each DMTC includes one or more DRS positions;
   a DRS monitor that listens for a DRS on an unlicensed band during a current DMTC period, wherein at least part of the current DMTC period collides with a data transmission within a transmission opportunity (TxOP), and wherein the data transmission has one or more fractional frames; and a DRS manager circuit that obtains the DRS during the current DMTC period, wherein the DRS in the current DMTC period is transmitted in a complete subframe of the TxOP.

18. The UE of claim 17, wherein the current DMTC starts before the TxOP and the DRS is transmitted in a position before the TxOP.

19. The UE of claim 17, wherein the current DMTC starts before the TxOP and the DRS is not transmitted before the TxOP, and wherein the DRS is transmitted in a predefined subframe next to a starting fractional subframe of the data transmission, and wherein the current DMTC overlaps with the TxOP with at least a whole subframe.

20. The UE of claim 17, wherein the current DMTC starts from a complete subframe within the TxOP, and wherein the DRS is transmitted in a predefined candidate position of the current DMTC.

21. The UE of claim 17, wherein the current DMTC starts from a fractional ending subframe, and wherein the DRS is transmitted in another candidate position of the current DMTC.

22. The UE of claim 17, wherein the DRS is multiplexed within the TxOP, and wherein a number of central PRBs are reserved such that the PDSCH is transmitted outside the reserved PRBs.

23. The UE of claim 22, wherein system information is required on the unlicensed band, and wherein the reserved central PRBs carry the required system information.

24. The UE of claim 22, wherein the reserved central PRBs are used to satisfy the requirement of occupied bandwidth and continuity transmission.

* * * * *